July 22, 1930.  J. E. SCHMIDT  1,770,948
VARIABLE DIAMETER PULLEY
Filed March 9, 1928
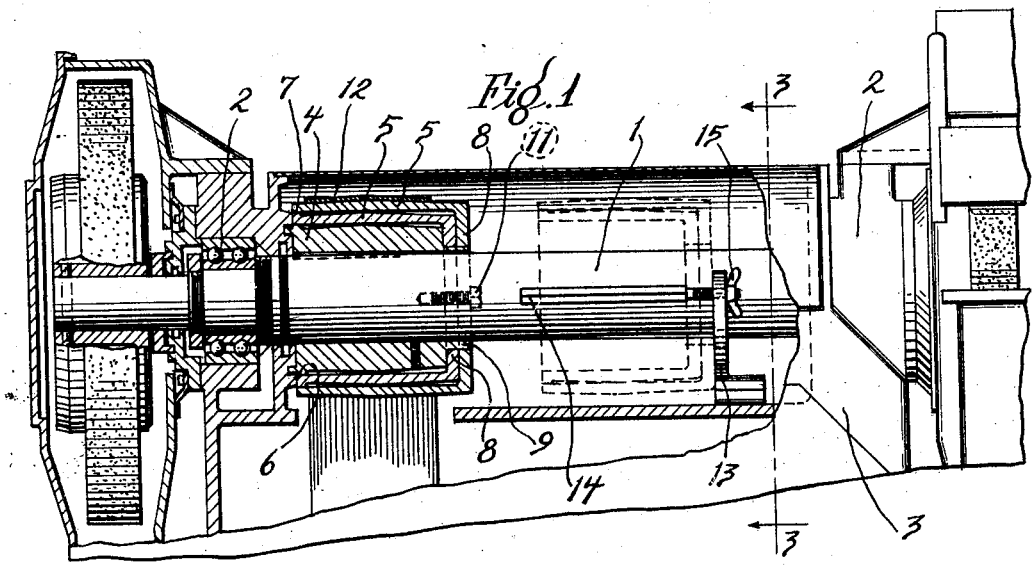
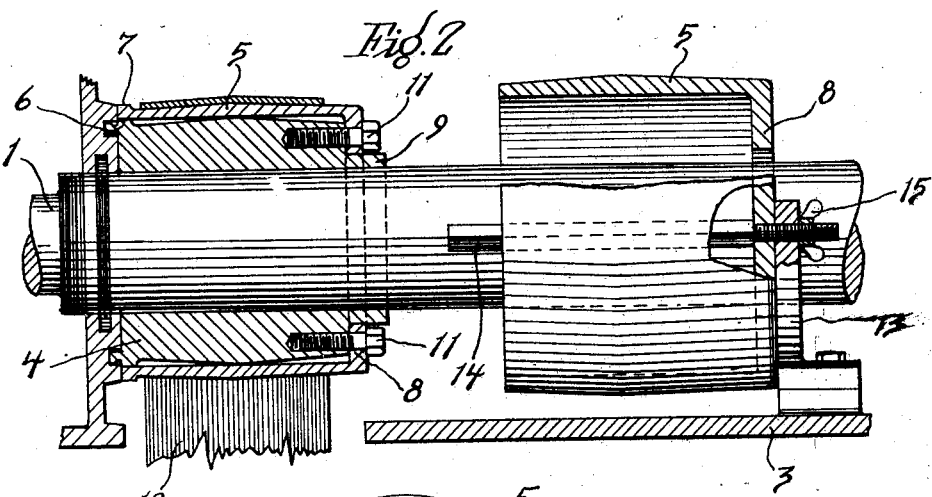
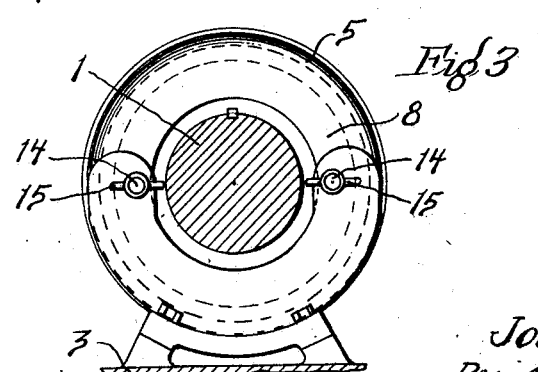
Inventor
John E. Schmidt
By Robert F. Miehle
Attorney Patented July 22, 1930

1,770,948

UNITED STATES PATENT OFFICE

JOHN E. SCHMIDT, OF CHICAGO, ILLINOIS, ASSIGNOR TO KLING BROS. ENGINEERING WORKS, OF CHICAGO, ILLINOIS, A CORPORATION OF ILLINOIS

VARIABLE-DIAMETER PULLEY

Application filed March 9, 1928. Serial No. 260,348.

My invention relates to cylindrical or flat belt pulleys and has for its main object the provision of a simple, convenient, and effective variable diameter crowned cylindrical pulley construction.

With this object in view my invention consists in certain features of novelty in the construction, combination, and arrangement of parts by which the said object and certain other objects, hereinafter appearing, are effected, all as fully described with reference to the accompanying drawing and more particularly pointed out in the claims.

In the said drawing—

Figure 1 is a partial front elevation of a grinding machine embodying my invention, with parts broken away and in section;

Figure 2 is a similar enlarged view of the pulley construction shown in Figure 1 with parts broken away and in section; and Figure 3 is a partial sectional view on the line 3—3 of Figure 1.

Like characters of reference indicate like parts in the several views.

Referring to the drawing, 1 designates a grinding wheel shaft of a grinder, and this shaft is rotatably mounted on spaced bearings 2 carried on a main frame 3. See Figure 1. Secured on the shaft 1 between the bearings 2 and adjacent one thereof is a crowned cylindrical pulley 4, and encircling the shaft 1 between the bearings 2 are two crowned pulley sleeves 5. These sleeves are of such diameters that they may be nested on the pulley 1, as shown in Figure 1.

In order that the pulley sleeves 5 may be carried, nested over the crowned portion of the pulley 4, with the pulley and in coaxial relation therewith, and preferably independently of the crowned portions of the pulley and inner sleeve, the following is provided. The end of the pulley 4 next to the adjacent bearing 2 is formed with a circumferential flange 6 which engages the bore of the inner sleeve 5, and the corresponding end of the inner sleeve 5 is provided with a circumferential flange 7 which engages the bore of the outer sleeve 5, whereby the corresponding ends of the sleeves are carried with the pulley in coaxial relation therewith, the diameters of the bores of the sleeves being such as to clear the crowned portions of the pulley 4 and the inner sleeves 5. Thus, the sleeves may be moved axially with respect to the pulley and each other to remove axially both sleeves or the outer sleeve only from their position over the pulley whereby to provide corresponding variations of the effective diameter of the pulley 4. Where as shown the sleeves 5 are supported on the pulley 4 independently of the crowned portion of the pulley and inner sleeve the following additional means is preferably provided. The correspondingly opposite ends of the sleeves 5 are provided with inwardly projecting radial flanges 8 which are adapted to engage, with the bores thereof, a concentric reduced portion 9 on the corresponding end of the pulley and to overlie axially the shoulder of the pulley resulting from said reduced portion, whereby the ends of the sleeves opposite the ends thereof corresponding with the flanges 6 and 7 are supported on the pulley in coaxial relation therewith. A pair of headed screws 11 pass through diametrically opposite apertures through the flanges 8 and are screwthreaded into the pulley 4 to releasably secure one or both of the sleeves, positioned over the crowned portion of the pulley, with the pulley. In Figure 1 both sleeves are shown nested over the crowned portion of the pulley, and in Figure 2 the inner sleeve only is shown positioned over the pulley, it being obvious that both sleeves may be removed axially from their positions over the pulley thus providing an additional pulley diameter. An endless flat belt 12 is trained over the pulley for driving the shaft 1, suitable belt adjusting means, not shown, being utilized to accommodate the various diameters of the pulley.

In order that the sleeves may be conveniently supported when they are positioned axially out of their positions over the crowned portion of the pulley 5, the following is provided. A bracket 13 is secured on the frame 3 adjacent the bearing 2 opposite that adjacent which the pulley 4 is disposed, and this bracket, spaced along the shaft outwardly from the end of the pulley corresponding with the ends of the sleeves on which the flanges 8 are disposed, extends about the shaft 1. See particularly Figures 2 and 3. Screw studs 14 pass through the aforementioned diametrically opposite apertures through the flanges 8 of the sleeves 5 and wing nuts 15 are screw-threaded on the screw studs 14 to clamp one or both of the sleeves 5, spaced axially out of their positions over the crowned portion of the pulley 4, on the bracket 13, thus providing for conveniently carrying one or both of the sleeves when they are not in use. In Figure 1, both sleeves are shown in broken lines supported on the bracket 13, and in Figure 2 the outer sleeve is shown supported on the bracket 13. The main portions of the screw studs 14 extend outwardly beyond the bore of the sleeves when supported on the bracket for the convenient manipulation thereof in mounting the sleeves on and dismounting the same from the bracket 13.

While I have described and shown the preferred embodiment of my invention I do not wish to be limited to the precise details of construction as changes may readily be made without departing from the spirit of my invention, but having thus described my invention, I claim as new and desire to secure by Letters Patent the following:—

1. In a variable diameter pulley the combination with a crowned cylindrical pulley, of a pulley sleeve axially movable into and out of position over said pulley, a circumferential flange on one end of said pulley and engageable in the bore of said pulley sleeve when said pulley sleeve is in superposed position with said pulley, an inwardly projecting radial flange on the correspondingly opposite end of said pulley sleeve, and means associated with said radial flange for detachably securing said pulley sleeve in superposed position with said pulley.

2. In a variable diameter pulley the combination with a crowned cylindrical pulley, of a pulley sleeve axially movable into and out of position over said pulley, a circumferential flange on one end of said pulley and engageable in the bore of said pulley sleeve when said pulley sleeve is in superposed position with said pulley, an inwardly projecting radial flange on the correspondingly opposite end of said pulley sleeve, and screw means for detachably securing said radial flange against the corresponding end of said pulley for securing said pulley sleeve in superposed position with said pulley.

3. In a variable diameter pulley the combination with a crowned cylindrical pulley, of two crowned pulley sleeves axially movable into and out of position over said pulley in nested relation, circumferential flanges on corresponding ends of said pulley and the inner pulley sleeve, the flange of said pulley being engageable in the bore of said inner pulley sleeve and the flange of said pulley sleeve being engageable in the bore of the outer pulley sleeve when said pulley sleeves are in superposed position with said pulley, inwardly projecting radial flanges on the correspondingly opposite ends of said pulley sleeves, and screw means for detachably securing the radial flange of said inner pulley sleeve or the radial flanges of both of said pulley sleeves in overlying relation against the corresponding end of said pulley for securing said inner pulley sleeve or both of said pulley sleeves in superposed position with said pulley.

4. In a variable diameter pulley the combination with a crowned cylindrical pulley, of two crowned pulley sleeves axially movable into and out of position over said pulley in nested relation, circumferential flanges on corresponding ends of said pulley and the inner pulley sleeve, the flange of said pulley being engageable in the bore of said inner pulley sleeve and the flange of said inner pulley sleeve being engageable in the bore of the outer pulley sleeve when said pulley sleeves are in superposed position with said pulley, inwardly projecting radial flanges on the correspondingly opposite ends of said pulley sleeves, and screw devices engageable in angularly spaced registerable holes through said radial flanges for detachably securing the radial flange of said inner pulley sleeve or the radial flanges of both of said pulley sleeves in overlying relation against the corresponding end of said pulley for securing said inner pulley sleeve or both of said pulley sleeves in superposed position with said pulley.

5. In a variable diameter pulley the combination with a revoluble shaft and a cylindrical pulley secured on said shaft, of a pulley sleeve encircling said shaft and axially movable into and out of position over said pulley and provided with an inwardly projecting radial flange on one end thereof, a stationary support spaced along said shaft from said pulley, and screw means operative upon said flange for detachably securing said radial flange against the corresponding end of said pulley for securing said pulley sleeve in superposed position with said pulley or for securing said radial flange against said support for securing said pulley sleeve out of superposed position.

6. In a variable diameter pulley the combination with a crowned cylindrical pulley, of two crowned pulley sleeves axially movable into and out of position over said pulley in nested relation, circumferential flanges on corresponding ends of said pulley and the inner pulley sleeve, the flange of said pulley being engageable in the bore of said inner pulley sleeve and the flange of said inner pulley sleeve being engageable in the bore of the outer pulley sleeve when said pulley sleeves are in superposed position with said pulley, inwardly projecting radial flanges on the correspondingly opposite ends of said pulley sleeves, a stationary support spaced along said shaft from said pulley, and screw devices engageable in angularly spaced registerable holes through said radial flanges for detachably securing the radial flange of said inner pulley sleeve or the radial flanges of both of said pulley sleeves in overlying relation against the corresponding end of said pulley for securing said inner pulley sleeve or both of said pulley sleeves in superposed position with said pulley and for securing the radial flange of said outer pulley sleeve or the radial flanges of both said pulley sleeves in overlying relation against said support for securing said outer pulley sleeve or both of said pulley sleeves out of superposed position.

In witness whereof I hereunto affix my signature this 2nd day of March, 1928.

JOHN E. SCHMIDT.